United States Patent
Noel et al.

(10) Patent No.: US 8,872,632 B2
(45) Date of Patent: *Oct. 28, 2014

(54) COLLISION RESOLUTION PROTOCOL FOR MOBILE RFID TAG IDENTIFICATION

(75) Inventors: Eric Noel, Holmdel, NJ (US); Kitming Wendy Tang, Stony Brook, NY (US); Jaewook Yu, Port Jefferson Station, NY (US)

(73) Assignees: AT&T Intellectual Property I, L.P., Atlanta, GA (US); The Research Foundation of State University of New York, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,781

(22) Filed: Sep. 14, 2012

(65) Prior Publication Data

US 2013/0009754 A1 Jan. 10, 2013

Related U.S. Application Data

(63) Continuation of application No. 12/291,129, filed on Nov. 6, 2008, now Pat. No. 8,305,194.

(51) Int. Cl.
*H04Q 5/22* (2006.01)
*G06K 7/10* (2006.01)
*G06K 7/00* (2006.01)
*H04W 74/08* (2009.01)

(52) U.S. Cl.
CPC .......... *G06K 7/0008* (2013.01); *G06K 7/10019* (2013.01); *H04W 74/0841* (2013.01); *H04Q 2213/13003* (2013.01)
USPC ...... 340/10.2; 340/10.1; 340/572.1; 340/10.3

(58) Field of Classification Search
USPC ............... 340/10.1, 10.2, 10.3, 10.31, 10.32, 340/10.33, 10.34, 10.4, 10.41, 10.5, 10.51, 340/572.1
See application file for complete search history.

(56) References Cited

U.S. PATENT DOCUMENTS

| | | | |
|---|---|---|---|
| 5,365,551 A | 11/1994 | Snodgrass et al. | |
| 2004/0160310 A1* | 8/2004 | Chen et al. | 340/10.2 |
| 2005/0237156 A1* | 10/2005 | Scherabon | 340/10.2 |

OTHER PUBLICATIONS

M. A. Bonuccelli, F. Lonetti, and F. Martelli. Tree slotted aloha: a new protocol for tag identification in rfid networks. Proceedings of the 2006 International Symposium on on World of Wireless. Mobile and Multimedia Networks, pp. 603-608, 2006.

T. X. Brown and S. Mohan. A mobility management strategy for personal communications systems. IEEE Transactions on Vehicular Technology, 46(2):269-278, 1988.

J. Capetanakis. Tree algorithms for packet broadcast channels. IEEE Transaction on Information Theory. IT-25(5):505-515. Sep. 1979.

(Continued)

*Primary Examiner* — Nabil Syed

(57) ABSTRACT

The performance of a radio frequency identification (RFID) system is improved by a protocol that eliminates collisions between signals generated by a) RFID tags that the RFID reader has already identified as being in its interrogation zone and b) RFID tags that are newly arrived and thus that the reader has not yet identified. This is illustratively accomplished by the use of separate identification and access frames. It is during the identification frame that newly arrived tags become identified by the reader. Although there may be collisions during the identification frame, those collisions are only among newly arrived tags. The already-identified tags communicate with the reader during respective time slots of the access frame, so that they neither collide with each other nor with the newly arrived tags.

4 Claims, 3 Drawing Sheets

(56) References Cited

OTHER PUBLICATIONS

EPCglobal. Epc radio frequency identity protocols class 1 generation 2 uhf rfid protocol for communications at 860-960 mhz. 2004.
K. Finkenzeller. RFID Handbook. "JohnWiley&Sons". New York. 1999. pp. 206-220.
D. Hush and C. Wood. Analysis of tree algorithms for rfid arbitration. IEEE International Symposium on Information Theory. p. 107. Aug. 1998.
J. L. Massey. Collision-resolution algorithms and random-access communications. Technical report, Apr. 1980.
J. Myung and W. Lee. Adaptive binary splitting: a rfid tag collision arbitration protocol for tag identification. Mobile Networks and Applications, 11(5):711-722, 2006.
R. Thomas, H. Gilbert, and G. Mazziotto. Influence of the movement of the mobile station on the performance of the radio cellular network. Proc. 3rd Nordic Seminar, Sep. 1988.
H. Vogt. Efficient object identification with passive rfid tags. pp. 98-113, 2002.

* cited by examiner

COLLISION RESOLUTION PROTOCOL FOR MOBILE RFID TAG IDENTIFICATION

This application is a continuation of U.S. patent application Ser. No. 12/291,129, filed Nov. 6, 2008, which is currently allowed and is herein incorporated by reference in its entirety.

The present invention relates to radio frequency identification (RFID).

Radio frequency identification (RFID) is a method to retrieve and store data using a radio channel. A RFID system consists of tags and a reader. A tag typically consists of radio-frequency circuits, a CPU, and a small memory and has a unique identifier, or "TAG_ID." By means of wireless communication between a reader and tags in which the tags identify themselves by communicating their respective identifiers to the reader, RFID systems track and/or manage objects in real-time.

One of the most challenging issues in RFID systems is the tag collision problem. When only one RF channel is used, as is typically the case in passive RFID systems, it is impossible to avoid collisions during communication between a reader and multiple tags. Passive tags only listen and respond to requests from the reader and do not interact with one another.

Several collision resolution protocols have been proposed for RFID systems. These protocols use similar principles but perform differently under different situations.

For example, the binary tree protocol—described, for example, in J. Capetanakis, "Tree algorithms for packet broadcast channels," *IEEE Transaction on Information Theory*, IT-25(5):505-515, September 1979; K. Finkenzeller, *RFID Handbook*, John Wiley & Sons, New York, 1999; and J. L. Massey "Collision-resolution algorithms and random-access communications," Multiuser Communication Systems, ed. G. Longo (Spriger, New York, 1981) 73-137.—repetitively divides the colliding tags into two groups until only one tag remains. The binary tree protocol can be implemented using either of two approaches: a deterministic one or a probabilistic one. The deterministic protocol divides the tag population using the TAG_IDs, while the probabilistic protocol divides the tag population by having tags choose 0 or 1 uniformly randomly. The RFID standard, "EPC Class 1 Generation 1" is based on the binary tree protocol and employs 8 bin slots to reduce collision probability among tags, as described, for example, in "EPC radio frequency identity protocols class-1 generation-2 UHF RFID protocol for communications at 860-960 MHz," EPCglobal Inc., Technical Report, 2004. Here, tags determine their own bin slot using their TAG_ID and can only access their own bin slot. If only one tag hits the specific bin slot, the tag is identified. However, selection of the appropriate number of bin slots is a challenging problem. As the number of bin slots gets smaller relative to the tag population, the collision-spreading effect of this approach becomes less effective. On the other hand, if the number of bin slots is far bigger than the tag population, the bin slot hit ratio decreases, causing more delay. Thus this protocol has to estimate the tag population in order to choose the optimal number of bin slots.

Tree slotted ALOHA—such as described in M. A. Bonuccelli, F. Lonetti, and F. Martelli, "Tree slotted aloha: a new protocol for tag identification in RFID networks," *Proceedings of the* 2006 *International Symposium on World of Wireless, Mobile and Multimedia Networks*, pages 603-608, 2006—and the Adaptive Binary Splitting (ABS) protocol—such as described in J. Myung and W. Lee, "Adaptive binary splitting: a RFID tag collision arbitration protocol for tag identification," *Mobile Networks and Applications*, 11(5):711-722, 2006—combine the collision-spreading technique and the time slot allocation to improve the collision resolution performance. The ABS protocol takes account of tag mobility. In this protocol, unknown tags choose a time slot number between 0 and a maximum slot number that is previously determined. This approach intentionally generates collisions between previously identified, or "known," tags and not-previously-identified, or "unknown," tags that have just arrived in the reader's interrogation zone to trigger the binary tree collision resolution. However, intentionally generated collisions introduce communication overhead in that the reader conducts the identification procedure for both the "known" and "newly" arrived tags.

Many prior tag identification protocols, including several of the protocols cited above, improve performance parameters such as speed of identification and the number of iterations required to identify the tags. However, many of those protocols are designed to identify all the tags from scratch whenever the reader performs identification rather than identifying only changes in the tag population that resulted from tag mobility, i.e., tags moving into or out of the reader's interrogation zone. There are a few protocols that consider tag mobility, but they still have an overhead problem that needs to be eliminated for better performance.

SUMMARY OF THE INVENTION

In according with the principles of the present invention, and in a departure from the prior art, we have recognized that the tag identification process can be improved by a protocol that allows for collisions among unknown tags while precluding collisions between known and unknown tags as well as between known tags.

In illustrative embodiments of the invention, unknown tags are restricted to communicate with the reader only at times set aside for this purpose. To this end a communication frame structure is illustratively employed comprised of an identification frame and an access frame. Unknown tags communicate with the reader only during the identification frame and known tags communicate with the reader only during the access frame, using a collision-free protocol—illustratively a protocol in which each known tag has an assigned time slot during which to communicate with the reader. Unknown tags may collide with one another during the identification frame, requiring the use of a collision resolution algorithm in order to identify all the unknown tags. However, unknown tags will not collide with known tags, thereby significantly reducing the overall occurrence of collisions and, as a result, increasing the speed with which unknown tags are identified.

Particular embodiments of the invention advantageously use a combination of various parameters and a tag state machine that, among other things, enable a tag to determine its status as a known or unknown tag; to become a known tag; and to determine access information that allows the tag to communicate with the reader along with the other known tags using the collision-free protocol. The access information is illustratively an identifier of a time slot assigned exclusively to the tag in question.

BRIEF DESCRIPTION OF THE DRAWING

The above and other aspects and features of the invention may be more fully appreciated from a consideration of the following detailed description and accompanying drawing, in which.

DETAILED DESCRIPTION OF AN ILLUSTRATIVE EMBODIMENT

Figure 1:
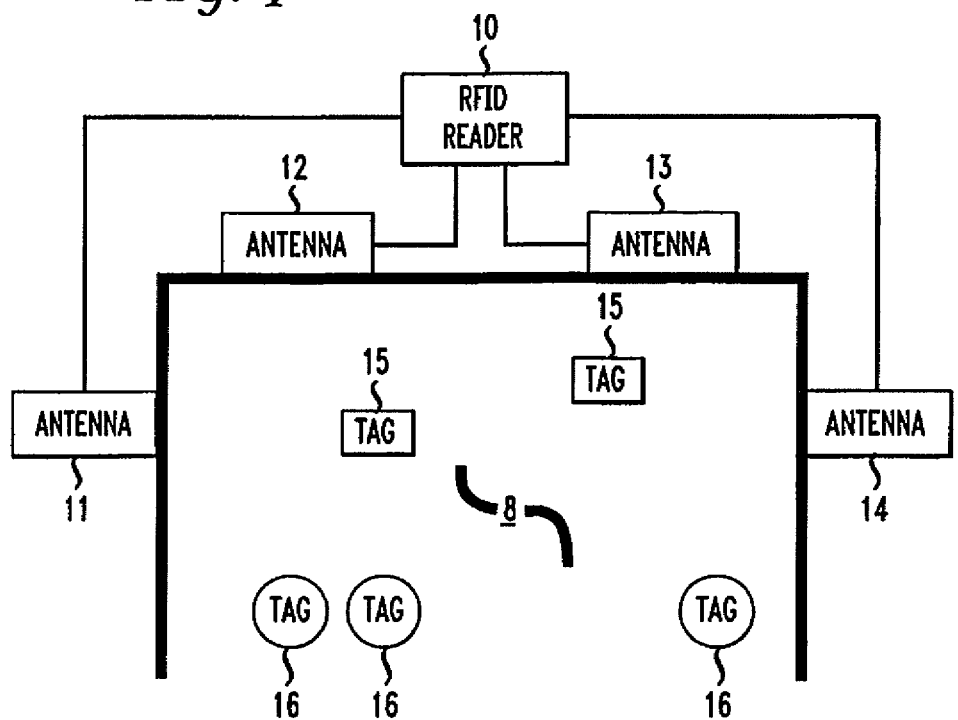
FIG. 1 shows a radio frequency identification, or RFID, system in which the present invention is illustratively implemented.

FIG. 1 shows a radio frequency identification, or RFID, system in which the present invention is illustratively implemented. RFID reader 10 uses multiple antennas 11, 12, 13 and 14 to detect signals from RFID tags 15 and 16 within an area 8, such as the area in the vicinity of a loading dock. Area 8 is hereinafter referred to as the reader's interrogation zone—this being a zone within which signals generated by the tags are detectable by the reader. The invention is equally applicable to environments in which there are multiple readers and tags traverse multiple interrogation zones. In warehouse environments, for example, the locations of items are tracked through an array of RFID readers.

Tags 15 are assumed to have been in interrogation zone 8 for some period of time in the past and have already been identified by reader 10 as being in interrogation zone 8. These are referred to herein as "known tags." Tags 16 are assumed to have entered interrogation zone 8 since the last time reader 10 determined what tags were present therein. Tags 16 are referred to herein as "unknown tags."

It is presumed that reader 10 communicates with all of the tags within the interrogation zone over a single radio frequency (RF) channel. Thus collisions occur when two or more tags attempt to communicate with reader 10 at the same time over the same RF channel. (For ease of discussion, the present description makes reference to the collision of tags but in reality, of course, it is signals generated by tags that actually collide.)

Collisions do not occur between known tags because they communicate with the reader using a collision-free protocol—illustratively a protocol in which each known tag has an assigned time slot during which it, and it alone, is allowed to communicate with reader 10. Unknown tags, however, have no assigned time slot and thus may collide with each other in the process of making their presence known to the reader. Moreover, unless an intervention scheme is introduced, the unknown tags may collide with previously identified tags as well.

Collision Resolution Protocol

In accordance with the principles of the present invention, and in a departure from the prior art, we have recognized that the tag identification process is improved by a protocol which
a) allows collisions between signals transmitted by ones of said unknown tags,
b) avoids collisions between signals transmitted by any of said known tags and signals transmitted by any of said unknown tags, and
c) avoids collisions between signals transmitted by any of said known tags and any other of said known tags.

Figure 2:
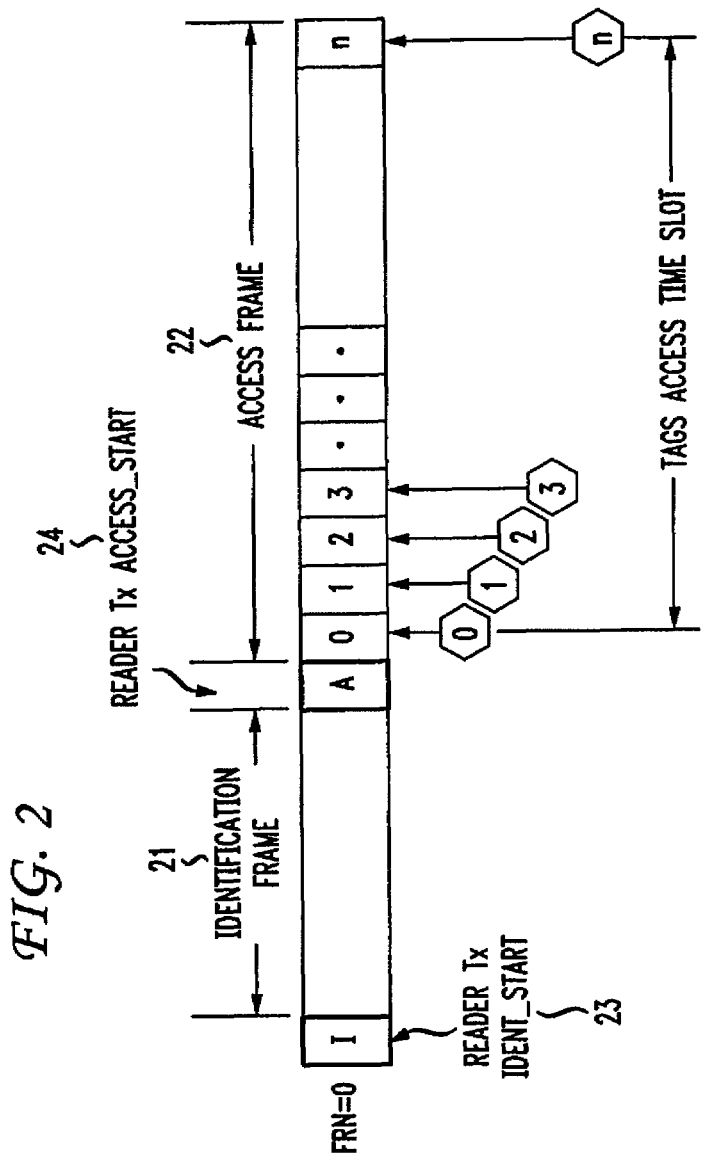
FIG. 2 shows a frame structure used in the illustrative embodiment to implement the invention.

This is illustratively accomplished by restricting unknown tags 16 to communicate with reader 10 only at times set aside for this purpose. To this end, a communication frame structure is illustratively employed, as shown in FIG. 2. The frame structure is comprised of an identification frame 21 and an access frame 22. Unknown tags communicate with reader 10 only during the identification frame and previously identified tags communicate with reader 10 only during the access frame. Unknown tags may collide with one another during the identification frame, requiring the use of a collision resolution algorithm in order to identify all the unknown tags. However, unknown tags will not collide with tags that the reader has already identified, thereby significantly reducing the overall occurrence of collisions and, as a result, increasing the speed with which unknown tags are identified. As will be seen, frames 21 and 22 do not have fixed durations. The duration of frame 21 depends on how long it takes for reader 10 to learn of the presence of all of the unknown tags in interrogation zone 8. The duration of frame 22 depends on the number, n, of known tags that are in the interrogation zone.

In carrying out the foregoing, the system implements a technique utilizing certain parameters stored on reader 10, as shown in Table 1, and certain parameters stored on the tags, as shown in Table 2. The use of these parameters is discussed in the description that follows.

TABLE 1

Reader Parameters

| Parameter | Description |
|---|---|
| FRN | Reader frame count |
| TAG_POP | Count of known tags (tag population) |
| TAG_OUT | Count of moved-out tags |
| NTC | Count of newly identified tags |

TABLE 2

Tag Parameters

| Parameter | Description |
|---|---|
| SC | Ongoing time slot count in access frame |
| FC | Tag frame count |
| TS | Value identifying an access frame time slot assigned to this tag |
| NTC | Count of number of new tags identified in the most recent identification frame |
| TAG_ID | Unique identifier of the tag |

Reader 10 starts an identification frame by broadcasting an identification start, or IDENT_START, message 23. That message includes a reader frame identifier that changes in a predetermined manner for each successive IDENT_START message. In this embodiment, the reader frame identifier is a number FRN that is initialized to zero and then reader 10 increments FRN by 1 for each successive IDENT_START message. IDENT_START message 23 also includes the tag population TAG_POP—the current total number of known tags. Each tag in the interrogation zone compares the value of FRN in the IDENT_START message with a tag frame count FC maintained by the tag. As will be seen, the results of that comparison allow the tag to determine whether it is known or unknown and to communicate with reader 10 accordingly.

During the identification frame, the reader communicates with the unknown tags to identify them. Once the access frame starts, tags that have been assigned a time slot communicate with the reader only in their assigned time slot. Tags that are identified during the identification frame are assigned a new time slot. Both known tags and tags that were identified in the just-concluded identification frame communicate with the reader during this access frame. That is, during the access frame, tags staying in the reader's zone communicate in its own time slot. If there is no communication in a time slot, waiting tags fill the missing time slot after the next access frame.

Figure 3:
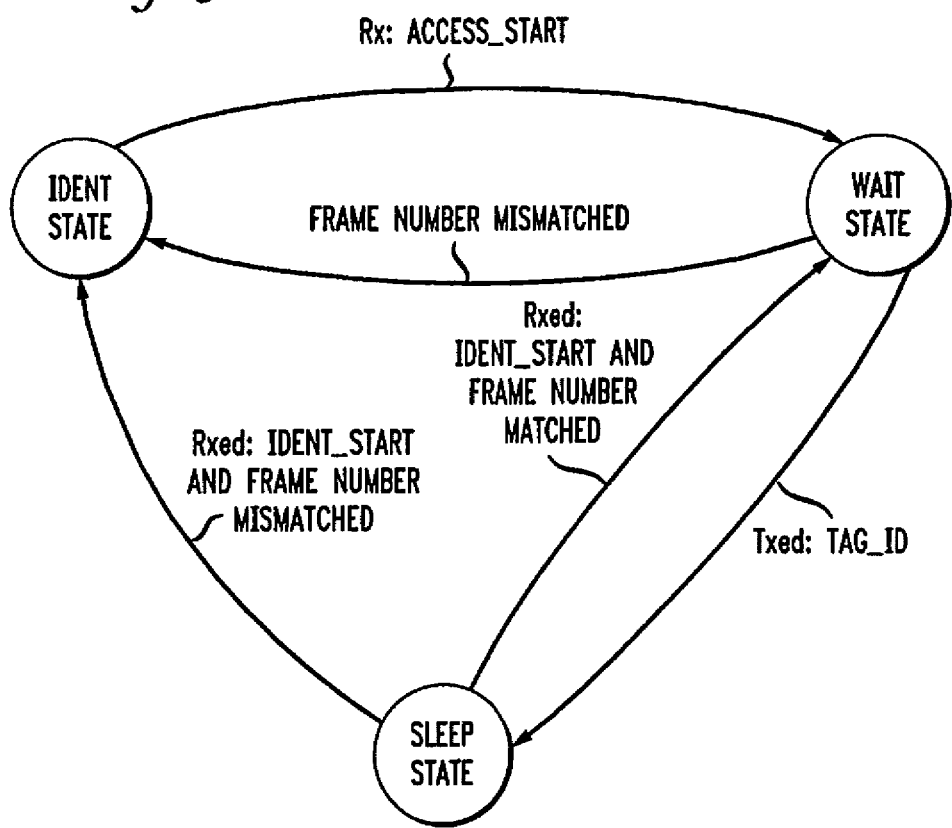
FIG. 3 shows a tag state machine of the protocol used in the illustrative embodiment.

Tag operation follows the state machine depicted in FIG. 3. The tag state machine is composed of three states: IDENT, WAIT, and SLEEP. Tag operation on each of the three states is described herein below.

Reader Operation

Algorithm 1 shows operation of the reader during both identification frame 21 and access frame 22.

The present disclosed embodiment illustratively uses a probabilistic binary tree protocol for tag identification, such as disclosed in the Captanakis and Myung papers

---

Algorithm 1 Reader operation
---
```
1:   FRN, TAG_POP ← 0
2:   while TRUE do
3:      /* Identification Frame */
4:      TS, NTC ← 0
5:      Tx IDENT_START
6:      while TS ≥ 0 do
7:         Collects responses from tags
8:         Check collision
9:         if no responses then
10:           TS ← TS – 1
11:           Tx NO_RESPONSE feedback
12:        else if collision then
13:           TS ← TS + 1
14:           Transmit COLLISION feedback
15:        else if one tag responds then
16:           NTC ← NTC + 1
17:           Identify the tag
18:           Tx NO_COLLISION feedback
19:        end if
20:     end while
21:
22:     /* Access Frame */
23:     TS ← 0
24:     TAG_OUT ← 0
25:     Tx ACCESS_START with FRN and NTC
26:
27:     while TS < TAG_POP + NTC do
28:        Wait tag response
29:        Check collision
30:        if no response then
31:           TAG_OUT←TAG_OUT+1
32:           Transmit NO_RESPONSE feedback
33:        else if one tag response then
34:           Transmit NO_COLLISION feedback
35:        else if collision then
36:           Transmit COLLISION feedback
37:        end if
38:        TS ← TS+1
39:     end while
40:     FRN ← FRN + 1
41:     TAG_POP ← MAX(TAG_POP – TAG_OUT, 0) + NTC
42: end while
``` cited above. However, any anti-collision algorithm that makes it possible to assign unknown tags with a unique TS and provide the reader with NTC, the count of new tags could be used. To start the identification, the reader broadcasts the IDENT_START message which, as noted above includes the values of the reader frame count FRN and the number of known tags TAG_POP. In response to the reader's IDENT_START message, unknown tags respond with their TAG_ID. If more than one tag respond at the same time, the reader detects a collision. To inform of the collision, the reader sends out a COLLISION feedback message. If only one tag responds to the reader's feedback, the reader identifies the tag and sends a NO_COLLISION feedback message to inform of the success. Until all tags are identified, the reader repeats the identification procedure. After the identification frame is done, the reader starts an access frame by sending the ACCESS_START message, which includes reader frame count FRN and the parameter NTC (the number of new tags identified during the just concluded identification frame). The protocol used during the access frame in the present illustrative embodiment—like the Slotted ALOHA and ABS protocols—detects when previously known tags have moved out of the interrogation area, referred to as "moved-out" tags. If a tag does not transmit its TAG_ID during its associated time slot, the reader transmits a NO_RESPONSE feedback message, which informs the remaining known tags of a time slot vacancy. As will be seen, this allows the moved-out tag's assigned time slot to be used by another tag in the next access frame. Specifically, all waiting tags decrease their assigned time slot by one to fill the vacancy. Only then will such tags be time synchronized, i.e., assigned a time slot, in the next access frame. Tag operations responsive to this and other feedback messages generated by the reader are described in the following section.

In an environment in which there are readers with overlapping interrogation zones, a collision may occur during the access frame because two tags may have been assigned to the same time slot by their respective readers. As indicated at lines 36-38 of Algorithm 1, COLLISION feedback is transmitted in this case and the colliding tags will change state to IDENT so as to be identified in the next access frame (line 24-26 in algorithm 4.

Tag Operation: Main

---

Algorithm 2: Main Tag Operation
---
```
1:   if Power-on by a reader then
2:      Wait Reader's IDENT_START message
3:      Read FRN and TAG_POP from message
4:      NTC ← 0
5:
6:      /* Determine State */
7:      TS, FC ← 0
8:      FC ← FRN
9:      state ← IDENT
10:
11:
12:     /* Tag Operation State Machine */
13:     while Power On do
14:        /* State Specific Operation */
15:        if state = IDENT then
16:           Run IDENT state tag operation
17:        else if state = WAIT then
18:           Run WAIT state tag operation
19:        else if state = SLEEP then
20:           Run SLEEP state operation
21:        end if
22:     end while
23:  end if
```

Algorithm 2 represents the main tag operation. Once a tag is powered on by having entered a reader's interrogation zone, the tag operation starts in the IDENT state waiting for the IDENT_START message from the reader. As noted above, the IDENT_START message carries the values of the reader frame count FRN and tag population TAG_POP. All tags that receive the IDENT_START message with the FRN value of 0 reset their values of TS and FC to 0 and set their state to IDENT. This makes all tags in the interrogation zone participate in the identification procedure to be described. If FRN>0, each tag changes FC in the same predetermined manner that the reader changes it from one identification frame to the next. Thus in this embodiment FC, like FRN, is a number that is incremented by 1 for each successive IDENT_START message.

It is assumed that each different reader within a region through which a tag may be moved over time does not have the same FRN value at the same time. This assumption is reasonable since each reader can randomly choose a starting value of FRN or can be assigned unique value to the FRN while it boots up. So the readers of neighboring interrogation zones have the same FRN at any time instance with a significantly small probability.

Given this assumption, matched FC and FRN means that the tag is an already known tag. Such tags enter into the WAIT state and wait until an access frame starts. Mismatched FC and FRN means that the tag is an unknown tag that has moved into reader 10's interrogation zone. The unknown tags set their state to IDENT and participate in a collision resolution procedure by performing the IDENT state tag operation of Algorithm 3 (described below). Once all new tags are identified, they are in the WAIT state. During the access frame, tags in the WAIT state—(both the tags that were identified in the just-concluded identification frame and the other tags that went directly into the WAIT state upon processing the IDENT_START message from the RFID reader) transmit their respective TAG_IDs during their respective time slots (assigned as discussed below). At the end of the access frame, all tags in the RFID reader interrogation zone set their state to SLEEP. Tags in the SLEEP state perform no further operations until a new IDENT_START message is received.

Tag Operation: IDENT State

Algorithm 3 describes tag operation in the IDENT state.

Tags in the IDENT state communicate with the reader in order to be identified and assigned a unique time slot by the reader. Tags set their states to IDENT in the following two cases. Firstly, when a reader is booted up initially, the reader does not have any tags identified and thus all the tags have to be identified. In this case, the reader transmits the IDENT_START message with FRN=0, and the tags which receive this message set their states to IDENT to participate in the identification frame. As an alternative, as noted above, the reader may transmit the IDENT_START message with FRN set to a random number or to a unique value associated with that reader.

| Algorithm 3-IDENT state tag operation |
| --- |
| 1: while state = IDENT do |
| 2:   if TS = 0 then |
| 3:     Transmit TAG_ID |
| 4:   else |
| 5:     state ← WAIT |
| 6:     break |
| 7:   end if |
| 8: |
| 9:   Wait Reader's feedback |
| 10:   if feedback = COLLISION then |
| 11:     if TS = 0 then |
| 12:       bin ← random binary number |
| 13:       TS ← TS + bin |
| 14:     else |
| 15:       TS ← TS + 1 |
| 16:     end if |
| 17:   else if feedback = NO_COLLISION then |
| 18:     if TS = 0 then |
| 19:       TS ← TAG_POP + NTC |
| 20:       state ← WAIT |
| 21:     else |
| 22:       TS ← MAX (TS − 1, 0) |
| 23:     end if |
| 24:     NTC ← NTC + 1 |
| 25:   end if |
| 26: end while |

Secondly, unknown tags set their state to the IDENT state. In the previous section, we assume that the FC value of the tag moved from another reader's interrogation zone is always different from the current reader's FRN. Thus the unknown tags with mismatched FC and FRN values are moved to the IDENT state. During the identification frame, we use the probabilistic binary tree algorithm for collision resolution as described in the above-cited Myung paper. Other collision resolution algorithms could be used, however.

Tag Operation: WAIT State

Algorithm 4 describes the tag operation when the tag is in the WAIT state.

Access frame has (TAG_POP+NTC) time slots. At every time slot, only one tag can respond, i.e., transmit during the slot, and thus no collisions happen in the access frame because unknown tags were separately identified in the identification frame and were assigned respective time slots.

During the WAIT state, the tag state machine waits until the tag receives the ACCESS_START message and in the meantime does not respond to reader's feedback messages. Once a tag receives the ACCESS_START message the tag state machine does react to the reader's messages. First the tag compares SC to the tag's TS. If they match, the tag broadcasts its ID. Then it waits for reader feedback. Upon receiving NO_COLLISION feedback, a tag whose SC matched TS goes into SLEEP state, whereas a tag whose SC did not match TS increments SC. On the other hand, for time slots associated with a known tag that moved out of the reader's interrogation zone, the reader does not receive any tag response. Once a reader detects the absence of a tag, the reader sends out NO_RESPONSE

| Algorithm 4: WAIT state tag operation |
| --- |
| 1:   Wait Reader's ACCESS_START message |
| 2:   Read FRN from the message |
| 3:   SC ← 0 |
| 4: |
| 5:   while state = WAIT do |
| 6:     if FC ! = FRN then |
| 7:       TS ← 0 |
| 8:       FC ← FRN |
| 9:       state ← IDENT |
| 10:     else if TS = SC then |
| 11:       Transmit TAG_ID |
| 12:     end if |
| 13: |
| 14:     Wait Reader's feedback |
| 15:     if feedback = NO_COLLISION then |
| 16:       if TS = SC then |
| 17:         state ← SLEEP |
| 18:       else |
| 19:         SC ← SC + 1 |
| 20:       end if |
| 21:     else if feedback = NO_RESPONSE then |
| 22:       TS ← MAX (TS − 1, 0) |
| 23:     else if feedback = COLLISION then |
| 24:       if TS = SC then |
| 25:         state ← IDENT |
| 26:       else |
| 27:         TS ← MAX (TS − 1, 0) (COMMENT: To catch error condition) |
| 28:     end if |
| 29: end while | feedback. In response to the NO_RESPONSE feedback, all tags in the WAIT state decrease their TS by 1 to fill the empty slot. Algorithm 4, lines 21 and 22 show the tag operation when the reader detects the absence of a tag, and the waiting tag that filled the vacancy will be time synchronized with the RFID reader in the subsequent access frame.

As a result of the time-slot-assignment process described above, at the end of the access frame, TS ranges from 0 to MAX(TAG_POP-TAG_OUT-1,0) for "known tags", while TS ranges from MAX(TAG_POP-TAG_OUT, 0) to MAX (TAG_POP-TAG_OUT+NTC-1, 0) for "unknown tags" that were assigned to time slots during the last identification frame.

Tag Operation: SLEEP State

Algorithm 5 shows the SLEEP state tag operation.

---

Algorithm 5 SLEEP state tag operation

```
1: while state = SLEEP do
2:          Wait Reader's IDENT_START message
3:          FC ← FC + 1
4:          if FC ! = FRN then
5:              TS ← 0
6:              FC ← FRN
7:              state ← IDENT
8:          else
9:              state ← WAIT
10:         end if
11: end while
```

---

In the SLEEP state, tags do not answer to the reader's feedback until they receive the IDENT_START message. A tag receiving IDENT_START message increases FC by 1 and compares the value with the FRN value obtained from the IDENT_START message. If the values match, the tag waits for the ACCESS_START message in the WAIT state. If the values mismatch, the tag places itself in the IDENT state and follows the identification procedure.

CONCLUSION

All of the prior art documents referred to herein are hereby incorporated by reference.

The foregoing merely illustrates the invention. The fundamental principle informing the present invention is our realization that it is desirable and possible to eliminate collisions between unknown and known tags in a way that improves the overall performance of the process. Another aspect of the invention is our recognition that an advantageous way of doing that is to restrict unknown tags to communicate with the RFID reader only at times set aside for this purpose. Those skilled in the art will appreciate that the particular frame structure, parameters, tag states and algorithmic approaches disclosed herein to implement the broad invention, while advantageous, are only illustrative of numerous alternative arrangements that could be devised to implement the principles of the invention without departing from their spirit and scope.

The invention claimed is:

1. A method comprising
controlling communications between known tags and unknown tags using a frame structure, wherein the known tags comprise radio frequency identification tags that a radio frequency identification reader has previously identified as being within an interrogation zone and the unknown tags comprise radio frequency identification tags that the radio frequency identification reader has not identified as being within the interrogation zone, comprising:
broadcasting, by the radio frequency identification reader, an identification start message indicating a beginning of an identification portion of the frame structure, wherein only the unknown tags communicate with the radio frequency identification reader during the identification portion, wherein the identification start message includes a reader frame identifier that is initialized to zero and increments by one for each successive identification start message, wherein the known tags and the unknown tags compare a tag frame count maintained by the each one of the known tags and the unknown tags to the reader frame identifier to determine whether a tag is a known tag or an unknown tag;
allowing, by the radio frequency identification reader, collisions between signals transmitted by ones of the unknown tags during the identification portion of the frame structure in which the unknown tags communicate with the radio frequency identification reader;
broadcasting, by the radio frequency identification reader, an access start message indicating a beginning of an access portion of the frame structure, wherein only known tags communicate with the radio frequency identification reader during the access portion; and
avoiding collisions between signals transmitted by any of the known tags and signals transmitted by any of the unknown tags and avoiding collisions between signals transmitted by any of the known tags and any other of the known tags by assigning by the radio frequency identification reader during the identification portion of the frame structure each one of the known tags a time slot of the access portion of the frame structure to communicate with the radio frequency identification reader during a respective time slot of the access portion of the frame, wherein the identification portion and the access portion of the frame structure do not have fixed durations.

2. The method of claim 1 wherein the identification portion comprises a designated identification time frame and the access portion comprises access time frames which are different from the designated identification time frame.

3. The method of claim 2 wherein the unknown tags are identified by the radio frequency identification reader during the designated identification time frame to become known tags.

4. The method of claim 3 wherein each of the known tags communicates with the radio frequency identification reader during the respective time slot of the access time frame and wherein the unknown tags, after becoming known tags, are assigned a new time slot of the access time frame.

* * * * *